(12) United States Patent
Ban et al.

(10) Patent No.: US 11,401,403 B2
(45) Date of Patent: Aug. 2, 2022

(54) ARTICLE CONTAINING BOTH THERMOPLASTIC AND ELASTOMER

(71) Applicant: TOP GLOVE INTERNATIONAL SDN. BHD., Klang (MY)

(72) Inventors: Wong Chong Ban, Klang (MY); Lim Keuw Wei, Klang (MY); Teh Chee Yang, Klang (MY); Mok Chun Fah, Klang (MY)

(73) Assignee: TOP GLOVE INTERNATIONAL SDN. BHD., Klang (MY)

( * ) Notice: Subject to any disclaimer, the term of this patent is extended or adjusted under 35 U.S.C. 154(b) by 335 days.

(21) Appl. No.: 16/705,558

(22) Filed: Dec. 6, 2019

(65) Prior Publication Data

US 2021/0095105 A1    Apr. 1, 2021

(30) Foreign Application Priority Data

Sep. 30, 2019  (MY) .............................. PI2019005744

(51) Int. Cl.
*C08L 9/04*  (2006.01)
*C08L 15/00*  (2006.01)
*A41D 19/00*  (2006.01)

(52) U.S. Cl.
CPC ............ *C08L 9/04* (2013.01); *A41D 19/0055* (2013.01); *C08L 15/00* (2013.01); *C08L 2201/08* (2013.01); *C08L 2201/52* (2013.01); *C08L 2205/03* (2013.01); *C08L 2312/00* (2013.01)

(58) Field of Classification Search
CPC ........ C08L 9/04; C08L 15/00; C08L 2312/00; C08L 2201/08; C08L 2205/03; C08L 2201/52; A41D 19/0055
USPC .......................................................... 524/156
See application file for complete search history.

(56) References Cited

U.S. PATENT DOCUMENTS

| 2002/0133864 A1* | 9/2002 | Saks | ....................... A61B 42/00 |
| | | | 2/161.7 |
| 2016/0159992 A1* | 6/2016 | Foo | .......................... C08K 3/30 |
| | | | 428/480 |

\* cited by examiner

*Primary Examiner* — Hui H Chin
(74) *Attorney, Agent, or Firm* — Bond Schoeneck & King, PLLC; Joseph M. Noto

(57) ABSTRACT

A latex formulation comprising elastomer, thermoplastic, accelerator, antifoaming agent, antioxidant, crosslinker, colouring agent, surfactant, filler, pH adjuster and dispersing medium, wherein the latex formulation has a total solid content ranging between 5% by weight to 40% by weight. A method of preparing a latex formulation to manufacture a glove containing both thermoplastic and elastomer, wherein the method comprises the steps of blending elastomer with thermoplastic to produce a dispersion and stirring the dispersion, adding while stirring accelerator, antifoaming agent, antioxidant, crosslinker, colouring agent, surfactant and filler one after another with no particular order and followed by pH adjuster into the dispersion to produce latex formulation and stirring continuously and allowing to mature, wherein total solid content is adjusted to between 5% by weight to 40% by weight by way of addition of dispersing medium and wherein pH range of the latex formulation is adjusted to between 9 to 11.

13 Claims, No Drawings

ARTICLE CONTAINING BOTH THERMOPLASTIC AND ELASTOMER

REFERENCE TO RELATED APPLICATION

This application is a U.S. Non-Provisional Application, which relates and claims priority to Malaysia Patent Application No. PI2019005744, filed Sep. 30, 2019, the entirety of which is hereby incorporated by reference in its entirety.

FIELD OF THE INVENTION

The present invention relates to a latex formulation and article manufactured therefrom, in particular the present invention relates to a latex formulation that is prepared from a blend of a hard polymer and a soft polymer which is subsequently used to prepare an article containing both thermoplastic and elastomer such as but not limited to a glove with good chemical resistance property.

BACKGROUND OF THE INVENTION

In food industries, gloves are introduced to protect the food from the user to prevent contamination. Hence, glove selection is rather critical when dealing with food handling. Several factors are considered before allowing a set of gloves to be used in the food industries, particularly but not limited to the gloves having good chemical resistance property and passing migration tests set by a regulatory body.

Acrylonitrile butadiene rubber (NBR) gloves are developed to be used in the food industry for having suitable characteristics such as but not limited to good dexterity, good puncture resistance and providing an alternative solution for users who are allergic to natural rubber latex. Yet, the NBR gloves exhibit setbacks such as but not limited to not being able to resist certain chemicals for instance acetic acid, as well as being cost ineffective (i.e. in view of choice of material).

Having said the above, it is apparent that existing elastomeric glove in the food industry, particularly NBR glove has its own disadvantages. As such, there is a need to identify a suitable latex formulation to produce a glove that is cost effective (i.e. in view of choice of material) without compromising the chemical resistance property, as well as is able to pass migration tests set by the appropriate regulatory body to qualify the usage in the food industry.

SUMMARY OF THE INVENTION

The present invention relates to a latex formulation comprising elastomer, thyermoplastic, accelerator, antifoaming agent, antioxidant, crosslinker, colouring agent, surfactant, filler, pH adjuster and dispersing medium, wherein the elastomer is any one selected from the group consisting of carboxylated acrylonitrile butadiene rubber (XNBR), acrylonitrile butadiene rubber (NBR) or mixtures therefrom, wherein the thermoplastic is any one selected from the group consisting of polyvinyl chloride (PVC), chlorinated polyvinyl chloride, poly(vinyl chloride/vinyl acetate) copolymer or mixtures therefrom, wherein the elastomer is used in an amount ranging between 50 phr to 99 phr and wherein the thermoplastic is used in an amount ranging between 1 phr to 50 phr to make up to 100 phr as total dry weight of the latexes, wherein the accelerator is used in an amount ranging between 0.5 phr to 4.0 phr based on total dry weight of the latexes, wherein the antifoaming agent is used in an amount ranging between 0.01 phr to 2.00 phr based on total dry weight of the latexes, wherein the antioxidant is used in an amount ranging between 0.5 phr to 5.0 phr based on total dry weight of the latexes, wherein the crosslinker is used in an amount ranging between 0.5 phr to 5.0 phr based on total dry weight of the latexes, wherein the colouring agent is used in an amount ranging between 0.5 phr to 3.0 phr based on total dry weight of the latexes, wherein the surfactant is used in an amount ranging between 0.0 phr to 5.0 phr based on total dry weight of the latexes, wherein the filler is used in an amount ranging between 0.5 phr to 10.0 phr based on total dry weight of the latexes and wherein the pH adjuster is used in an amount ranging between 0.5 phr to 4.0 phr based on total dry weight of the latexes and wherein the dispersing medium is used in an amount to adjust total solid content of the latex formulation to a range between 5% by weight to 40% by weight.

Also, the present invention discloses a method of preparing a latex formulation to manufacture a glove containing both thermoplastic and elastomer, wherein the method comprises the steps of:

blending elastomer with thermoplastic to produce a dispersion containing both thermoplastic and elastomer and stirring the dispersion containing both thermoplastic and elastomer for a duration between 2 minutes to 30 minutes until a homogeneous blend is achieved, wherein the elastomer is used in an amount ranging between 50 phr to 99 phr and wherein the thermoplastic is used in an amount ranging between 1 phr to 50 phr to make up to 100 phr as total dry weight of the latexes;

adding while stirring accelerator, antifoaming agent, antioxidant, crosslinker, colouring agent, surfactant and filler one after another with no particular order and followed by pH adjuster into the dispersion containing both thermoplastic and elastomer to produce latex formulation, wherein the latex formulation comprising the accelerator in an amount ranging between 0.5 phr to 4.0 phr based on total dry weight of the latexes, the antifoaming agent in an amount ranging between 0.01 phr to 2.00 phr based on total dry weight of the latexes, the antioxidant in an amount ranging between 0.5 phr to 5.0 phr based on total dry weight of the latexes, the crosslinker in an amount ranging between 0.5 phr to 5.0 phr based on total dry weight of the latexes, the colouring agent in an amount ranging between 0.5 phr to 3.0 phr based on total dry weight of the latexes, the surfactant in an amount ranging between 0.0 phr to 5.0 phr based on total dry weight of the latexes, the filler in an amount ranging between 0.5 phr to 10.0 phr based on total dry weight of the latexes and the pH adjuster in an amount ranging between 0.5 phr to 4.0 phr based on total dry weight of the latexes; and stirring the latex formulation continuously and allowing the latex formulation to mature for a duration between 1 hour to 48 hours, wherein total solid content of the latex formulation is adjusted to be between 5% by weight to 40% by weight by way of addition of dispersing medium into the latex formulation and wherein pH range of the latex formulation is adjusted to be between 9 to 11.

DETAILED DESCRIPTION OF THE INVENTION

Detailed description of preferred embodiments of the present invention is disclosed herein. It should be understood, however, that the embodiments are merely exemplary of the present invention, which may be embodied in various forms. Therefore, the details disclosed herein are not to be interpreted as limiting, but merely as the basis for the claims and for teaching one skilled in the art of the invention. The numerical data or ranges used in the specification are not to be construed as limiting.

The present invention relates to a latex formulation prepared from a blend of a thermoplastic and an elastomer and glove manufactured therefrom, in particular the present invention relates to a latex formulation that is prepared from a blend of a hard polymer and a soft polymer which is subsequently used to prepare article containing both thermoplastic and elastomer that is cost effective (i.e. in view of choice of material) without compromising the chemical resistance property, as well as is able to pass migration tests set by the appropriate regulatory body to qualify the usage in the food industry (which will be further detailed in the example section i.e. particularly see tables 2 to 6).

The latex formulation comprises at least (a) an elastomer, (b) a thermoplastic and (c) processing additives. The processing additives include but not limited to accelerator, antifoaming agent, antioxidant, crosslinker, colouring agent, surfactant, filler, pH adjuster and dispersing medium. The elastomer is any one selected from the group consisting of carboxylated acrylonitrile butadiene rubber (XNBR), acrylonitrile butadiene rubber (NBR) or mixtures therefrom, preferably XNBR.

The elastomer is also known as soft polymer. Hence, for the purpose of this invention hereinafter the term "soft polymer" may be used interchangeably with "elastomer". Having said the above, the elastomer may also be any one soft polymer with glass transition temperature ($T_g$) of less than 25° C., preferably any one soft polymer with glass transition temperature ($T_g$) between −25° C. to 20° C. The soft polymer has an average particle size ranging between 90 nm to 140 nm.

Meanwhile, the thermoplastic is any one selected from the group consisting of polyvinyl chloride (PVC), chlorinated polyvinyl chloride, poly(vinyl chloride/vinyl acetate) copolymer or mixtures therefrom, preferably PVC. The thermoplastic is also known as hard polymer. Hence, for the purpose of this invention hereinafter the term "hard polymer" may be used interchangeably with "thermoplastic". Having said the above, the thermoplastic may also be any one hard polymer with glass transition temperature ($T_g$) of more than 25° C., preferably any one hard polymer with glass transition temperature ($T_g$) between 25° C. to 120° C. The hard polymer has an average particle size ranging between 150 nm to 250 nm.

The thermoplastic is used in liquid dispersion (latex) form instead of dry form such as but not limited to the forms of powder and/or plastisol. Further, the thermoplastic used in the present invention is not a plasticized thermoplastic. For instance, the present invention does not use a plasticized PVC. For the purpose of this invention, the term "thermoplastic and elastomer product" signifies product made from the latex formulation containing blends of both the elastomer and the thermoplastic. The thermoplastic and elastomer product is a glove. However, the thermoplastic and elastomer product may be extended to medical and/or non-medical applications as well as any film forming applications such as but not limited to condom, exercise band and dental dam.

The accelerator is any one selected from the group consisting of tetramethylthiuram (TMTD), 2,2'-dithio-bis (benzothiazole) (MBTS), N-cyclohexylbenzothiazole-sulfinicamide (CBS), zinc diethylthiocarbamate (ZDEC), zinc dibutyldithiocarbamate (ZDBC), thiuram, carbamate or mixtures therefrom, preferably ZDEC or ZDBC. The antifoaming agent is any one selected from the group consisting of silicone based antifoaming agent, silicone free antifoaming agent or mixtures therefrom, preferably silicone free antifoaming agent. The silicone based antifoaming agent is selected from the group consisting of silicone glycols, other modified silicone fluids or mixtures therefrom. The silicone free antifoaming agent is selected from the group consisting of oil emulsion, emulsion of waxes or mixtures therefrom.

The antioxidant is any one selected from the group consisting of arylamines, polymeric hindered phenols or mixtures therefrom, preferably polymeric hindered phenols. The arylamines are selected from the group consisting of alkylated diphenylamines, p-phenylenediamines or mixtures therefrom. The polymeric hindered phenols are selected from the group consisting of butylated hindered phenol, styrenated hindered phenol or mixtures therefrom. The crosslinker is any one selected from the group consisting of sulphur, sulphur-containing compounds, zinc oxide, other metal based oxides or mixtures therefrom, preferably sulphur or zinc oxide.

The colouring agent is any one selected from the group consisting of any conventional dyes, any conventional pigments, titanium dioxide or mixtures therefrom, preferably any conventional pigments or titanium dioxide. The surfactant is any one selected from the group consisting of linear alkylbenzene sulphonates (LAS), alcohol ether sulphates (AES), secondary alkane sulphonates (SAS), alcohol sulphates or mixtures therefrom, preferably LAS. The LAS may be any one selected from the group consisting of sodium dodecylbenzenesulphonate, ammonium undecylbenzenesulphonate, potassium dodecylbenzenesulphonate or mixtures therefrom, preferably sodium dodecylbenzenesulphonate or potassium dodecylbenzenesulphonate.

The AES may be any one selected from the group consisting of sodium laureth sulphate, ammonium laureth sulphate or mixtures therefrom, preferably sodium laureth sulphate. The SAS may be any one of sodium C14 to C18 alkane sulphonate, preferably sodium 1-tetradecanesulphonate. The alcohol sulphates may be any one selected from the group consisting of sodium lauryl sulphate, ammonium lauryl sulphate, triethanolamine lauryl sulphate or mixtures therefrom, preferably sodium lauryl sulphate or ammonium lauryl sulphate.

The filler is any one selected from the group consisting of any conventional silicate based filler, any conventional calcium carbonate based filler and carbon black, preferably any conventional silicate based filler. The pH adjuster is any one selected from the group consisting of ammonia, sodium hydroxide, potassium hydroxide, ammonium hydroxide or mixtures therefrom, preferably ammonia. The dispersing medium is water.

The latex formulation is prepared to manufacture glove containing both thermoplastic and elastomer, wherein the method comprises the steps of:
 i. blending elastomer (as listed above) with thermoplastic (as listed above) to produce a dispersion containing both thermoplastic and elastomer and stirring the dispersion containing both thermoplastic and elastomer for a duration between 2 minutes to 30 minutes, preferably 15 minutes until a homogeneous blend is achieved, wherein the elastomer is used in an amount ranging between 50 phr to 99 phr, preferably in an amount ranging between 70 phr to 95 phr, still preferably in an amount of 90 phr and wherein the thermoplastic is used in an amount ranging between 1 phr to 50 phr, preferably in an amount ranging between 5 phr to 30 phr, still preferably in an amount of 10 phr respectively to make up to 100 phr which hereinafter will be considered as total dry weight of the latexes;

ii. adding while stirring accelerator (as listed above), antifoaming agent (as listed above), antioxidant (as listed above), crosslinker (as listed above), colouring agent (as listed above), surfactant (as listed above) and filler (as listed above) one after another with no particular order and followed by pH adjuster (as listed above) into the dispersion containing both thermoplastic and elastomer to produce latex formulation, wherein the latex formulation comprising:

the accelerator in an amount ranging between 0.5 phr to 4.0 phr based on total dry weight of the latexes, preferably between 1.0 phr to 2.0 phr based on total dry weight of the latexes, still preferably 1.5 phr based on total dry weight of the latexes, the antifoaming agent in an amount ranging between 0.01 phr to 2.00 phr based on total dry weight of the latexes, preferably between 0.02 phr to 1.00 phr based on total dry weight of the latexes, still preferably 0.03 phr based on total dry weight of the latexes, the antioxidant in an amount ranging between 0.5 phr to 5.0 phr based on total dry weight of the latexes, preferably between 1.0 phr to 3.0 phr based on total dry weight of the latexes, still preferably 2.0 phr based on total dry weight of the latexes, the crosslinker in an amount ranging between 0.5 phr to 5.0 phr based on total dry weight of the latexes, preferably between 1.0 phr to 3.0 phr based on total dry weight of the latexes, still preferably 1.2 phr based on total dry weight of the latexes, the colouring agent in an amount ranging between 0.5 phr to 3.0 phr based on total dry weight of the latexes, preferably between 1.0 phr to 2.0 phr based on total dry weight of the latexes, still preferably 1.1 phr based on total dry weight of the latexes, the surfactant in an amount ranging between 0.0 phr to 5.0 phr based on total dry weight of the latexes, preferably between 0.2 phr to 2.0 phr based on total dry weight of the latexes, still preferably 1.0 phr based on total dry weight of the latexes, the filler in an amount ranging between 0.5 phr to 10.0 phr based on total dry weight of the latexes, preferably between 1.0 phr to 5.0 phr based on total dry weight of the latexes, still preferably 1.5 phr based on total dry weight of the latexes, and the pH adjuster in an amount ranging between 0.5 phr to 4.0 phr based on total dry weight of the latexes, preferably between 1.0 phr to 2.0 phr based on total dry weight of the latexes, still preferably 1.5 phr based on total dry weight of the latexes; and iii. stirring the latex formulation continuously and allowing the latex formulation to mature for a duration between 1 hour to 48 hours, preferably 15 hours to 30 hours, still preferably 24 hours, wherein total solid content of the latex formulation is adjusted to be between 5% by weight to 40% by weight by way of addition of dispersing medium into the latex formulation either before or after maturation of the latex formulation and wherein pH range of the latex formulation is adjusted to be between 9 to 11 prior to be used to prepare the glove containing both thermoplastic and elastomer.

The present invention utilizes water (the dispersing medium) as diluent. The latter assists in achieving homogeneous blend of both the elastomer and the thermoplastic and the same is attained by way of latex blending without requirement of any external heating and/or application of pressure. For the purpose of this invention, the phrase "one after another with no particular order" signifies that any one of the chemicals may be added first and followed by the other since order of mixing is not crucial.

For the purpose of this invention, the term "dispersion containing both thermoplastic and elastomer" signifies dispersion containing blends of both the elastomer and the thermoplastic in the latex formulation. For the purpose of this invention, the phrase "total dry weight of the latexes" signifies totality calculated from sum of the dry weight of the elastomer and the dry weight of the thermoplastic.

The glove containing both thermoplastic and elastomer is prepared using latex formulation as disclosed above adopting a method commonly known in the glove manufacturing industry. The method to prepare the glove containing both the thermoplastic and the elastomer (as stated above) comprises the steps of:

i. dipping a former into a coagulant solution at a temperature between 40° C. to 65° C. for a time period ranging from 4 seconds to 30 seconds to coat a coagulant layer on the former, wherein the former is washed prior to be used in step (i) and wherein the coagulant solution is any conventional coagulant solution;

ii. drying the coagulant layer coated on the former obtained in step (i) at a temperature between 80° C. to 200° C. for a time period ranging from 1 minute to 10 minutes;

iii. dipping the former obtained in step (ii) into first latex formulation at a temperature between 20° C. to 40° C. for a time period ranging from 4 seconds to 30 seconds to produce a first latex layer, wherein the first latex layer has a total solid content of 5% by weight to 40% by weight;

iv. drying the first latex layer coated on the former obtained in step (iii) at a temperature between 80° C. to 150° C. for a time period ranging from 20 seconds to 5 minutes;

v. dipping the former obtained in step (iv) into second latex formulation at a temperature between 20° C. to 40° C. for a time period ranging from 4 seconds to 30 seconds to produce a second latex layer, wherein the second latex layer has a total solid content of 5% by weight to 40% by weight;

vi. drying the second latex layer coated on the former obtained in step (v) at a temperature between 80° C. to 200° C. for a time period ranging from 20 seconds to 5 minutes;

vii. treating the second latex layer coated on the former obtained in step (vi) with hot water at a temperature between 40° C. to 80° C. for a time period ranging from 20 seconds to 5 minutes to leach out chemical residues to form pre-leached latex film;

viii. curing the pre-leached latex film coated on the former obtained in step (vii) at a temperature between 90° C. to 150° C. for a time period ranging from 5 minutes to 45 minutes to produce latex film, wherein the latex film is made from blends of both the elastomer and the thermoplastic;

ix. treating the latex film coated on the former obtained in step (viii) with chlorine water at ambient temperature for a time period ranging from 10 seconds to 60 seconds to obtain treated latex film;

x. treating the treated latex film obtained in step (ix) with hot water at a temperature between 40° C. to 80° C. for a time period ranging from 20 seconds to 5 minutes to leach out chemical residues to obtain post-leached latex film;

xi. drying the post-leached latex film coated on the former obtained in step (x) at a temperature between 80° C. to 200° C. for a time period ranging from 20 seconds to 5 minutes to produce glove containing both thermoplastic and elastomer; and xii. stripping the glove obtained in step (xi) from the former; and wherein the first and the second latex formulations are identical latex formulation, which was discussed above.

The glove prepared has a tensile strength ranging between 21 MPa to 26 MPa, an elongation at break ranging between 400% to 650% and is able to pass in the migration test as well as is able to comply with chemical permeation resistance tests. Lastly, the glove of the present invention:

i. contains no latex protein;
ii. contains no phthalate based plasticizers;
iii. is able to achieve mechanical properties (with up to 30% usage of thermoplastic) that are comparable to the conventional XNBR and/or PVC gloves, which will be further detailed in the example section i.e. see tables 2 and 3;
iv. is able to pass all migration tests (with up to 30% usage of thermoplastic), particularly 3% acetic acid and 50% ethanol, which will be further detailed in the example section i.e. see table 4; and
v. is able to achieve chemical resistance property (with up to 20% usage of thermoplastic) against the chemical permeation, particularly the 40% NaOH and 99% acetic acid that is comparable to the conventional XNBR glove, which will be further detailed in the example section i.e. see tables 5 and 6.

The following examples are constructed to illustrate the present invention in a non-limiting sense.

Example 1

Latex Formulation

Latex formulation comprising:

(a) elastomer, wherein the elastomer is any one selected from the group consisting of carboxylated acrylonitrile butadiene rubber (XNBR), acrylonitrile butadiene rubber (NBR) or mixtures therefrom, preferably XNBR;

(b) thermoplastic, wherein the thermoplastic is any one selected from the group consisting of polyvinyl chloride (PVC), chlorinated polyvinyl chloride, poly(vinyl chloride/vinyl acetate) copolymer or mixtures therefrom, preferably PVC and wherein the thermoplastic is in liquid dispersion form;

(c) accelerator, wherein the accelerator is any one selected from the group consisting of tetramethylthiuram (TMTD), 2,2'-dithio-bis(benzothiazole) (MBTS), N-cyclohexylbenzothiazole-sulfinicamide (CBS), zinc diethylthiocarbamate (ZDEC), zinc dibutyldithiocarbamate (ZDBC), thiuram, carbamate or mixtures therefrom, preferably ZDEC or ZDBC;

(d) antifoaming agent, wherein the antifoaming agent is any one selected from the group consisting of silicone based antifoaming agent, silicone free antifoaming agent or mixtures therefrom, preferably silicone free antifoaming agent, wherein the silicone based antifoaming agent is selected from the group consisting of silicone glycols, other modified silicone fluids or mixtures therefrom and wherein the silicone free antifoaming agent is selected from the group consisting of oil emulsion, emulsion of waxes or mixtures therefrom;

(e) antioxidant, wherein the antioxidant is any one selected from the group consisting of arylamines, polymeric hindered phenols or mixtures therefrom, preferably polymeric hindered phenols, wherein the arylamines are selected from the group consisting of alkylated diphenylamines, p-phenylenediamines or mixtures therefrom and wherein the polymeric hindered phenols are selected from the group consisting of butylated hindered phenol, styrenated hindered phenol or mixtures therefrom;

(f) crosslinker, wherein the crosslinker is any one selected from the group consisting of sulphur, sulphur-containing compounds, zinc oxide, other metal based oxides or mixtures therefrom, preferably sulphur or zinc oxide;

(g) colouring agent, wherein the colouring agent is any one selected from the group consisting of any conventional dyes, any conventional pigments, titanium dioxide or mixtures therefrom, preferably any conventional pigments or titanium dioxide;

(h) surfactant, wherein the surfactant is any one selected from the group consisting of linear alkylbenzene sulphonates (LAS), alcohol ether sulphates (AES), secondary alkane sulphonates (SAS), alcohol sulphates or mixtures therefrom, preferably LAS;

(i) filler, wherein the filler is any one selected from the group consisting of any conventional silicate based filler, any conventional calcium carbonate based filler and carbon black, preferably any conventional silicate based filler;

(j) pH adjuster, wherein the pH adjuster is any one selected from the group consisting of ammonia, sodium hydroxide, potassium hydroxide, ammonium hydroxide or mixtures therefrom, preferably ammonia; and (k) dispersing medium, wherein the dispersing medium is water.

Table 1 summarizes chemical components (as listed above) used (in parts per hundred rubber, phr) in preparing the latex formulation.

TABLE 1

Chemical components used to prepare the latex formulation

| Chemicals | Working range (phr) | Preferred range (phr) | Dosage (phr) |
|---|---|---|---|
| Elastomer (latex) | 50 to 99 | 70 to 95 | 90 |
| Thermoplastic (latex) | 1 to 50 | 5 to 30 | 10 |
| Accelerator | 0.5 to 4.0 (based | 1.0 to 2.0 (based | 1.5 (based on |

TABLE 1-continued

Chemical components used to prepare the latex formulation

| Chemicals | Working range (phr) | Preferred range (phr) | Dosage (phr) |
| --- | --- | --- | --- |
| Antifoaming agent | 0.01 to 2.00 (based on total dry weight of the latexes) | 0.02 to 1.00 (based on total dry weight of the latexes) | 0.03 (based on total dry weight of the latexes) |
| Antioxidant | 0.5 to 5.0 (based on total dry weight of the latexes) | 1.0 to 3.0 (based on total dry weight of the latexes) | 2.0 (based on total dry weight of the latexes) |
| Crosslinker | 0.5 to 5.0 (based on total dry weight of the latexes) | 1.0 to 3.0 (based on total dry weight of the latexes) | 1.2 (based on total dry weight of the latexes) |
| Colouring agent | 0.5 to 3.0 (based on total dry weight of the latexes) | 1.0 to 2.0 (based on total dry weight of the latexes) | 1.1 (based on total dry weight of the latexes) |
| Surfactant | 0.0 to 5.0 (based on total dry weight of the latexes) | 0.2 to 2.0 (based on total dry weight of the latexes) | 1.0 (based on total dry weight of the latexes) |
| Filler | 0.5 to 10.0 (based on total dry weight of the latexes) | 1.0 to 5.0 (based on total dry weight of the latexes) | 1.5 (based on total dry weight of the latexes) |
| pH adjuster | 0.5 to 4.0 (based on total dry weight of the latexes) | 1.0 to 2.0 (based on total dry weight of the latexes) | 1.5 (based on total dry weight of the latexes) |
| Dispersing medium | used at an amount to adjust total solid content of the latex formulation between 5% by weight to 40% by weight | | |

For the purpose of this invention, the phrase "total dry weight of the latexes" signifies totality calculated from sum of the dry weight of the elastomer and the dry weight of the thermoplastic.

Example 2

Preparation of the Latex Formulation

The latex formulation is prepared to manufacture a glove containing both thermoplastic and elastomer, wherein the method comprises the steps of:
  i. blending elastomer (as listed above) with thermoplastic (as listed above) to produce a dispersion containing both thermoplastic and elastomer and stirring the dispersion containing both thermoplastic and elastomer for a duration between 2 minutes to 30 minutes, preferably 15 minutes until a homogeneous blend is achieved, wherein the elastomer is used in an amount ranging between 50 phr to 99 phr, preferably in an amount ranging between 70 phr to 95 phr, still preferably in an amount of 90 phr and wherein the thermoplastic is used in an amount ranging between 1 phr to 50 phr, preferably in an amount ranging between 5 phr to 30 phr, still preferably in an amount of 10 phr respectively to make up to 100 phr which hereinafter will be considered as total dry weight of the latexes;
  ii. adding while stirring accelerator (as listed above), antifoaming agent (as listed above), antioxidant (as listed above), crosslinker (as listed above), colouring agent (as listed above), surfactant (as listed above) and filler (as listed above) one after another with no particular order and followed by pH adjuster (as listed above) into the dispersion containing both thermoplastic and elastomer to produce latex formulation, wherein the latex formulation comprising:
    the accelerator in an amount ranging between 0.5 phr to 4.0 phr based on total dry weight of the latexes, preferably between 1.0 phr to 2.0 phr based on total dry weight of the latexes, still preferably 1.5 phr based on total dry weight of the latexes,
    the antifoaming agent in an amount ranging between 0.01 phr to 2.00 phr based on total dry weight of the latexes, preferably between 0.02 phr to 1.00 phr based on total dry weight of the latexes, still preferably 0.03 phr based on total dry weight of the latexes,
    the antioxidant in an amount ranging between 0.5 phr to 5.0 phr based on total dry weight of the latexes, preferably between 1.0 phr to 3.0 phr based on total dry weight of the latexes, still preferably 2.0 phr based on total dry weight of the latexes,
    the crosslinker in an amount ranging between 0.5 phr to 5.0 phr based on total dry weight of the latexes, preferably between 1.0 phr to 3.0 phr based on total dry weight of the latexes, still preferably 1.2 phr based on total dry weight of the latexes,
    the colouring agent in an amount ranging between 0.5 phr to 3.0 phr based on total dry weight of the latexes, preferably between 1.0 phr to 2.0 phr based on total dry weight of the latexes, still preferably 1.1 phr based on total dry weight of the latexes,
    the surfactant in an amount ranging between 0.0 phr to 5.0 phr based on total dry weight of the latexes, preferably between 0.2 phr to 2.0 phr based on total dry weight of the latexes, still preferably 1.0 phr based on total dry weight of the latexes,
    the filler in an amount ranging between 0.5 phr to 10.0 phr based on total dry weight of the latexes, preferably between 1.0 phr to 5.0 phr based on total dry weight of the latexes, still preferably 1.5 phr based on total dry weight of the latexes, and
    the pH adjuster in an amount ranging between 0.5 phr to 4.0 phr based on total dry weight of the latexes, preferably between 1.0 phr to 2.0 phr based on total dry weight of the latexes, still preferably 1.5 phr based on total dry weight of the latexes; and iii. stirring the latex formulation continuously and allowing the latex formulation to mature for a duration between 1 hour to 48 hours, preferably 15 hours to 30 hours, still preferably 24 hours, wherein total solid content of the latex formulation is adjusted to be between 5% by weight to 40% by weight by way of addition of dispersing medium into the latex formulation either before or after maturation of the latex formulation and wherein pH range of the latex formulation is adjusted to be between 9 to 11 prior to be used to prepare the glove containing both the thermoplastic and the elastomer.

For the purpose of this invention, the phrase "one after another with no particular order" signifies that any one of the chemicals may be added first and followed by the other since order of mixing is not crucial. For the purpose of this invention, the term "dispersion containing both thermoplastic and elastomer" signifies dispersion containing blends of both the elastomer and the thermoplastic in the latex formulation. For the purpose of this invention, the phrase "total dry weight of the latexes" signifies totality calculated from sum of the dry weight of the elastomer and the dry weight of the thermoplastic.

Example 3

Glove Containing Both Thermoplastic and Elastomer

Manufacturing glove containing both the thermoplastic and the elastomer using latex formulation as prepared in example 2 (using the Latex Formulation from example 1) adopting method commonly known in the glove manufacturing industry.

The method to prepare the glove containing both the thermoplastic and the elastomer (using the Latex Formulation from example 1) comprises the steps of:
  i. dipping a former into a coagulant solution at a temperature between 40° C. to 65° C. for a time period ranging from 4 seconds to 30 seconds to coat a coagulant layer on the former, wherein the former is washed prior to be used in step (i) and wherein the coagulant solution is any conventional coagulant solution;
  ii. drying the coagulant layer coated on the former obtained in step (i) at a temperature between 80° C. to 200° C. for a time period ranging from 1 minute to 10 minutes;
  iii. dipping the former obtained in step (ii) into first latex formulation at a temperature between 20° C. to 40° C. for a time period ranging from 4 seconds to 30 seconds to produce a first latex layer, wherein the first latex layer has a total solid content of 5% by weight to 40% by weight;
  iv. drying the first latex layer coated on the former obtained in step (iii) at a temperature between 80° C. to 150° C. for a time period ranging from 20 seconds to 5 minutes;
  v. dipping the former obtained in step (iv) into second latex formulation at a temperature between 20° C. to 40° C. for a time period ranging from 4 seconds to 30 seconds to produce a second latex layer, wherein the second latex layer has a total solid content of 5% by weight to 40% by weight;
  vi. drying the second latex layer coated on the former obtained in step (v) at a temperature between 80° C. to 200° C. for a time period ranging from 20 seconds to 5 minutes;
  vii. treating the second latex layer coated on the former obtained in step (vi) with hot water at a temperature between 40° C. to 80° C. for a time period ranging from 20 seconds to 5 minutes to leach out chemical residues to form pre-leached latex film;
  viii. curing the pre-leached latex film coated on the former obtained in step (vii) at a temperature between 90° C. to 150° C. for a time period ranging from 5 minutes to 45 minutes to produce latex film, wherein the latex film is made from blends of both elastomer and thermoplastic;
  ix. treating the latex film coated on the former obtained in step (viii) with chlorine water at ambient temperature for a time period ranging from 10 seconds to 60 seconds to obtain treated latex film;
  x. treating the treated latex film obtained in step (ix) with hot water at a temperature between 40° C. to 80° C. for a time period ranging from 20 seconds to 5 minutes to leach out chemical residues to obtain post-leached latex film;
  xi. drying the post-leached latex film coated on the former obtained in step (x) at a temperature between 80° C. to 200° C. for a time period ranging from 20 seconds to 5 minutes to produce glove containing both the thermoplastic and the elastomer; and
  xii. stripping the glove obtained in step (xi) from the former; and
wherein the first and the second latex formulations are identical latex formulation, which was discussed in example 1.

Mechanical properties (i.e. tensile strength and elongation at break) of the prepared glove are tested according to standard method ASTM D6319. Further, the prepared glove is tested for migration and chemical permeation resistance property.

Tables 2 to 3 show comparison of the mechanical properties of the glove prepared in the present invention and carboxylated acrylonitrile butadiene rubber (XNBR) glove prepared conventionally (as control).

TABLE 2

Tensile strength (MPa) of the glove of the present invention and conventional XNBR glove

| | Tensile strength (MPa) | |
|---|---|---|
| **Glove samples | Before aging | *After aging |
| XNBR glove (control) | 26.85 | 22.60 |
| Glove of the present invention (XNBR:PVC = 90:10 by weight) | 23.20 | 25.85 |
| Glove of the present invention (XNBR:PVC = 85:15 by weight) | 22.61 | 21.93 |
| Glove of the present invention (XNBR:PVC = 80:20 by weight) | 22.71 | 24.29 |
| Glove of the present invention (XNBR:PVC = 70:30 by weight) | 22.80 | 21.16 |
| ASTM D6319 for XNBR | Minimum 14 | |
| ASTM D5250 for PVC | Minimum 11 | |

*Aging condition: Heating at a temperature of 70° C. for a period of 7 days
**Thickness of dumbbells (mm): 0.056 to 0.058

TABLE 3

Elongation at break (%) of the glove of the present invention and conventional XNBR glove

| **Glove samples | Elongation at break (%) | |
|---|---|---|
| | Before aging | *After aging |
| XNBR glove (control) | 621.46 | 521.38 |
| Glove of the present invention (XNBR:PVC = 90:10 by weight) | 628.24 | 460.92 |
| Glove of the present invention (XNBR:PVC = 85:15 by weight) | 553.08 | 437.44 |
| Glove of the present invention (XNBR:PVC = 80:20 by weight) | 503.02 | 425.26 |
| Glove of the present invention (XNBR:PVC = 70:30 by weight) | 485.94 | 459.82 |
| ASTM D6319 for XNBR | Minimum 500 | Minimum 400 |
| ASTM D5250 for PVC | Minimum 300 | Minimum 300 |

*Aging condition: Heating at a temperature of 70° C. for a period of 7 days
**Thickness of dumbbells (mm): 0.056 to 0.058

Glove prepared using latex formulation of the present invention is able to meet the standard requirements of mechanical properties as well as is able to achieve almost comparable mechanical properties (i.e. elongation at break and tensile strength) as of the conventional XNBR glove, proving that the mechanical properties of the glove of the present invention are not compromised.

Tables 4 and 5 show comparison of the migration and the chemical permeation resistance test results of the glove prepared in the present invention and carboxylated acrylonitrile butadiene rubber (XNBR) glove prepared conventionally (as control).

TABLE 4

Outcome of the migration test for the glove of the present invention and conventional XNBR glove

| | *Migration test (mg/dm$^2$) | | |
|---|---|---|---|
| Glove samples | Simulant B, 3% acetic acid | Simulant D1, 50% ethanol | Status |
| XNBR glove (control) | 5.64 | 4.89 | Pass |
| Glove of the present invention (XNBR:PVC = 90:10 by weight) | 2.53 | 3.53 | Pass |
| Glove of the present invention (XNBR:PVC = 85:15 by weight) | 4.62 | 6.86 | Pass |
| Glove of the present invention (XNBR:PVC = 80:20 by weight) | 5.25 | 1.90 | Pass |
| Glove of the present invention (XNBR:PVC = 70:30 by weight) | 7.19 | 2.30 | Pass |

*Passing requirements of Regulation (EU) No. 10/2011 (including amendment 1282/2011) is ≤10 mg/dm$^2$
*Aging condition: Heating at a temperature of 70° C. for a period of 7 days Other migration tests available for testing to determine if a glove is safe for food handling are such as but not limited to tests using simulant A (10% v/v ethanol), simulant C (20% v/v ethanol) and simulant D2 (vegetable oil). Based on Regulation (EU) No. 10/2011, simulants A, B and C are assigned for foods that have hydrophilic characteristics and tend to be extracted/dissolved in water. These foods are generally aqueous in nature. Simulants D1 and D2 are for foods that have lipophilic characteristics and tend to be extracted/dissolved in fats, oils and/or organic solvents (i.e. hexane and toluene).

Remark: There are no results for simulants A and C because theoretically if the glove could pass the migration test for higher concentration of ethanol (50%), lower concentrations of 10% and 20% ethanol would be easily fulfilled. Similarly, there is no result for simulant D2 because conventional XNBR glove could pass the migration test for simulant D2. Hence glove of the present invention which has XNBR as one of its components would easily satisfy the test.

TABLE 5

Outcome of the chemical permeation resistance test for the glove of the present invention and conventional XNBR glove

| | *Chemical permeation resistance test (***minutes (Level)) | |
|---|---|---|
| **Glove samples | 40% NaOH | 99% Acetic acid |
| XNBR glove (control) | ≥480 (Level 6) | 6 (Level 0) |
| Glove of the present invention (XNBR:PVC = 90:10 by weight) | ≥480 (Level 6) | 9 (Level 0) |
| Glove of the present invention (XNBR:PVC = 85:15 by weight) | ≥480 (Level 6) | 11 (Level 1) |
| Glove of the present invention (XNBR:PVC = 80:20 by weight) | ≥480 (Level 6) | 11 (Level 1) |
| Glove of the present invention (XNBR:PVC = 70:30 by weight) | 412 (Level 5) | 7 (Level 0) |

*Aging condition: Heating at a temperature of 70° C. for a period of 7 days
**Thickness of Dumbbells (mm): 0.054 to 0.064
***Table 6 shows classification of permeation resistance performance

TABLE 6

Classification of chemical permeation resistance performance

| Measured breakthrough time (minutes) | Permeation resistance performance |
|---|---|
| ≥10 | 1 |
| ≥30 | 2 |
| ≥60 | 3 |
| ≥120 | 4 |
| ≥240 | 5 |
| ≥480 | 6 |

Based on the chemical permeation resistance test results summarized in table 5, it is apparent that all the gloves (with different combinations of NBR/PVC) prepared using latex formulation of the present invention are able to resist the permeation of 40% NaOH and 99% acetic acid which are almost identically as of the conventional XNBR glove. This could be attributed to the polar nature of chlorine atom in PVC which would resist the diffusion of chemicals such as the acetic acid across the gloves.

As a whole, the latex formulation and the glove prepared therefrom (of the present invention) are able to overcome the conventional shortcomings since the glove of the present invention is cost effective (i.e. in view of choice of material since PVC is cheaper than XNBR) without compromising the chemical resistance property (i.e. able to resist the permeation of 40% NaOH and 99% acetic acid as of the conventional XNBR glove), as well as is able to pass all migration tests set by the European regulatory body to qualify the usage in the food industry.

Lastly, the glove of the present invention:
(i) contains no latex protein;
(ii) contains no phthalate based plasticizers;
(iii) is able to achieve mechanical properties (with up to 30% usage of thermoplastic) that are comparable to the conventional XNBR and/or PVC gloves;
(iv) is able to pass all migration tests (with up to 30% usage of thermoplastic), particularly 3% acetic acid and 50% ethanol; and
(v) is able to achieve chemical resistance property (with up to 20% usage of thermoplastic) against the chemical permeation, particularly the 40% NaOH and 99% acetic acid that is comparable to the conventional XNBR glove.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises", "comprising", "including" and "having" are inclusive and therefore specify the presence of stated features, integers, steps, operations, elements and/or components, but do not preclude the presence or addition of one or more other features, integers, steps, operations, elements, components and/or groups therefrom.

The method steps, processes and operations described herein are not to be construed as necessarily requiring their performance in the particular order discussed or illustrated, unless specifically identified as an order of performance. It is also to be understood that additional or alternative steps may be employed. The use of the expression "at least" or "at least one" suggests the use of one or more elements, as the use may be in one of the embodiments to achieve one or more of the desired objects or results.

The invention claimed is:

1. Latex formulation comprising elastomer, thermoplastic, accelerator, antifoaming agent, antioxidant, crosslinker, colouring agent, surfactant, filler, pH adjuster and dispersing medium, wherein the accelerator is used in an amount ranging between 0.5 phr to 4.0 phr based on total dry weight of the latexes, wherein the antifoaming agent is used in an amount ranging between 0.01 phr to 2.00 phr based on total dry weight of the latexes, wherein the antioxidant is used in an amount ranging between 0.5 phr to 5.0 phr based on total dry weight of the latexes, wherein the crosslinker is used in an amount ranging between 0.5 phr to 5.0 phr based on total dry weight of the latexes, wherein the colouring agent is used in an amount ranging between 0.5 phr to 3.0 phr based on total dry weight of the latexes, wherein the surfactant is used in an amount ranging between 0.0 phr to 5.0 phr based on total dry weight of the latexes, wherein the filler is used in an amount ranging between 0.5 phr to 10.0 phr based on total dry weight of the latexes and wherein the pH adjuster is used in an amount ranging between 0.5 phr to 4.0 phr based on total dry weight of the latexes and wherein dispersing medium is used in an amount to adjust total solid content of the latex formulation to a range between 5% by weight to 40% by weight characterized in that the elastomer is any one selected from the group consisting of carboxylated acrylonitrile butadiene rubber (XNBR), acrylonitrile butadiene rubber (NBR) and mixtures therefrom, wherein the thermoplastic is any one selected from the group consisting of polyvinyl chloride (PVC), chlorinated polyvinyl chloride, poly(vinyl chloride/vinyl acetate) copolymer and mixtures therefrom, wherein the elastomer is used in an amount ranging between 50 phr to 99 phr and wherein the thermoplastic is used in an amount ranging between 1 phr to 50 phr to make up to 100 phr as total dry weight of the latexes.

2. The latex formulation as claimed in claim 1 wherein the thermoplastic is in liquid dispersion form.

3. The latex formulation as claimed in claim 1 wherein the accelerator is any one selected from the group consisting of tetramethylthiuram (TMTD), 2,2'-dithio-bis(benzothiazole) (MBTS), N-cyclohexylbenzothiazole-sulfinicamide (CBS), zinc diethylthiocarbamate (ZDEC), zinc dibutyldithiocarbamate (ZDBC), thiuram, carbamate and mixtures therefrom.

4. The latex formulation as claimed in claim 1 wherein the antifoaming agent is any one selected from the group consisting of silicone based antifoaming agent, silicone free antifoaming agent and mixtures therefrom.

5. The latex formulation as claimed in claim 1 wherein the antioxidant is any one selected from the group consisting of arylamines, polymeric hindered phenols and mixtures therefrom.

6. The latex formulation as claimed in claim 1 wherein the crosslinker is any one selected from the group consisting of sulphur, sulphur-containing compounds, metal based oxides and mixtures therefrom.

7. The latex formulation as claimed in claim 1 wherein the colouring agent is selected from the group consisting of dyes, pigments, titanium dioxide and mixtures therefrom.

8. The latex formulation as claimed in claim 1 wherein the surfactant is any one selected from the group consisting of linear alkylbenzene sulphonates (LAS), alcohol ether sulphates (AES), secondary alkane sulphonates (SAS), alcohol sulphates and mixtures therefrom.

9. The latex formulation as claimed in claim 1 wherein the filler is selected from the group consisting of silicate based filler, calcium carbonate based filler and carbon black.

10. The latex formulation as claimed in claim 1 wherein the pH adjuster is any one selected from the group consisting of ammonia, sodium hydroxide, potassium hydroxide, ammonium hydroxide and mixtures therefrom.

11. The latex formulation as claimed in claim 1 wherein the dispersing medium is water.

12. A glove containing both thermoplastic and elastomer produced using latex formulation as claimed in claim 1.

13. The latex formulation as claimed in claim 6 wherein the crosslinker is zinc oxide.

* * * * *